United States Patent [19]

Lupke et al.

[11] 4,319,872
[45] Mar. 16, 1982

[54] APPARATUS FOR PRODUCING THERMOPLASTIC TUBING

[76] Inventors: Gerd P. H. Lupke, 46 Stornoway Crescent; Manfred A. A. Lupke, 35 Ironshield Crescent, both of Thornhill, Ontario, Canada

[21] Appl. No.: 142,015

[22] Filed: Apr. 21, 1980

Related U.S. Application Data

[63] Continuation-in-part of Ser. No. 855,409, Nov. 28, 1977, Pat. No. 4,199,314.

[30] Foreign Application Priority Data

Dec. 1, 1976 [CA] Canada ................................. 266970

[51] Int. Cl.³ ........................ B29C 17/07; B29D 23/04
[52] U.S. Cl. .................................... 425/532; 264/508; 425/326.1; 425/812
[58] Field of Search ........................ 249/141, 113, 135; 425/525, 532, 537, 539, 326.1, 381, 387.1, 392, 396, 371, 437, 466, 812, 336, 369; 264/508, 209.5

[56] References Cited

U.S. PATENT DOCUMENTS

| 3,262,159 | 7/1966 | Falkenau et al. | 425/812 X |
| 3,677,676 | 7/1972 | Hegler | 425/532 X |
| 3,751,541 | 8/1973 | Hegler | 425/326.1 X |
| 3,981,663 | 9/1976 | Lupke | 425/326.1 |
| 4,184,831 | 1/1980 | Hegler et al. | 425/326.1 X |
| 4,199,314 | 4/1980 | Lupke et al. | 425/532 |

FOREIGN PATENT DOCUMENTS 1181531 6/1959 France ................................. 264/508

Primary Examiner—Jan H. Silbaugh
Attorney, Agent, or Firm—Ridout & Maybee

[57] ABSTRACT

Apparatus for producing corrugated thermoplastic tubing of the type comprising a pair of complementary upper and lower mold assemblies each having an endless chain of articulately interconnected mold blocks which are driven along a forward run and back along a return run, the mold blocks cooperating in pairs along the forward run to form an axially extending tubular mold tunnel, within which the tubing is expanded by vacuum forming or blow molding. The mold blocks have mold-defining faces of corrugated form with alternating troughs and crests. Each mold block is formed with passages which extend between the bases of the troughs of the corrugations and the exterior of the mold block. These passages communicate with the base of each trough throughout its length, and serve to permit the escape of any atmospheric air which is trapped by the tubing in the troughs during expansion of the tubing.

5 Claims, 13 Drawing Figures

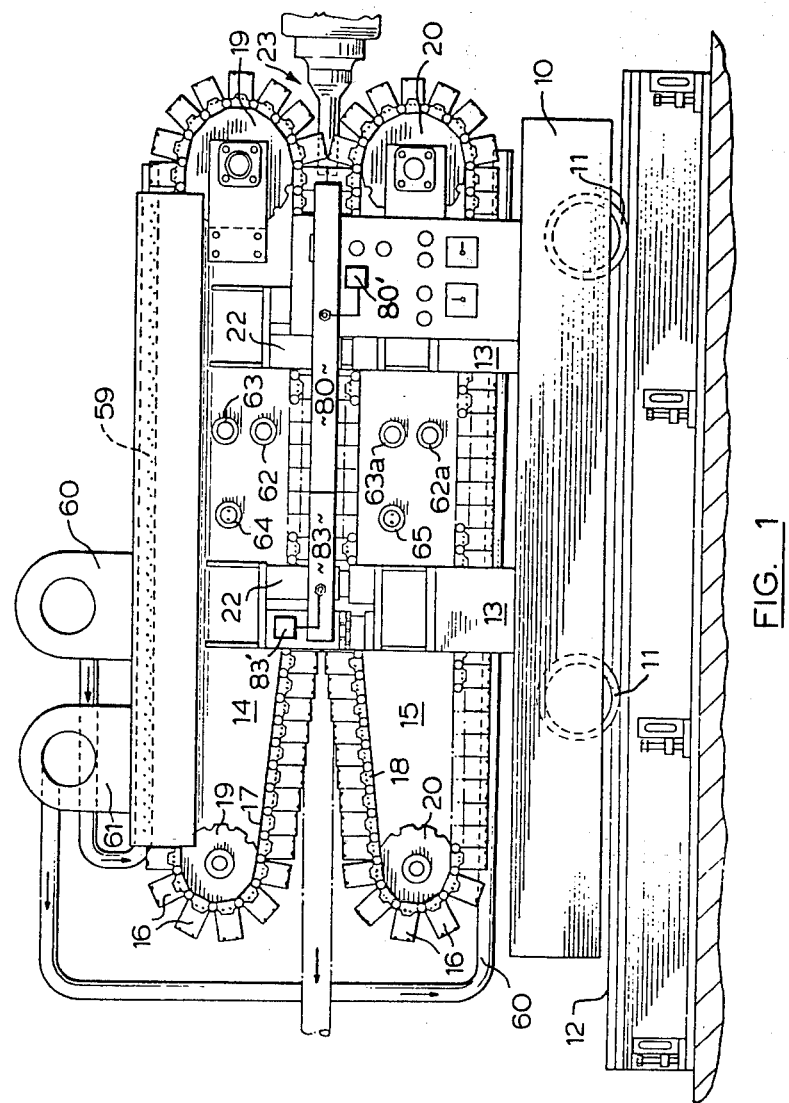

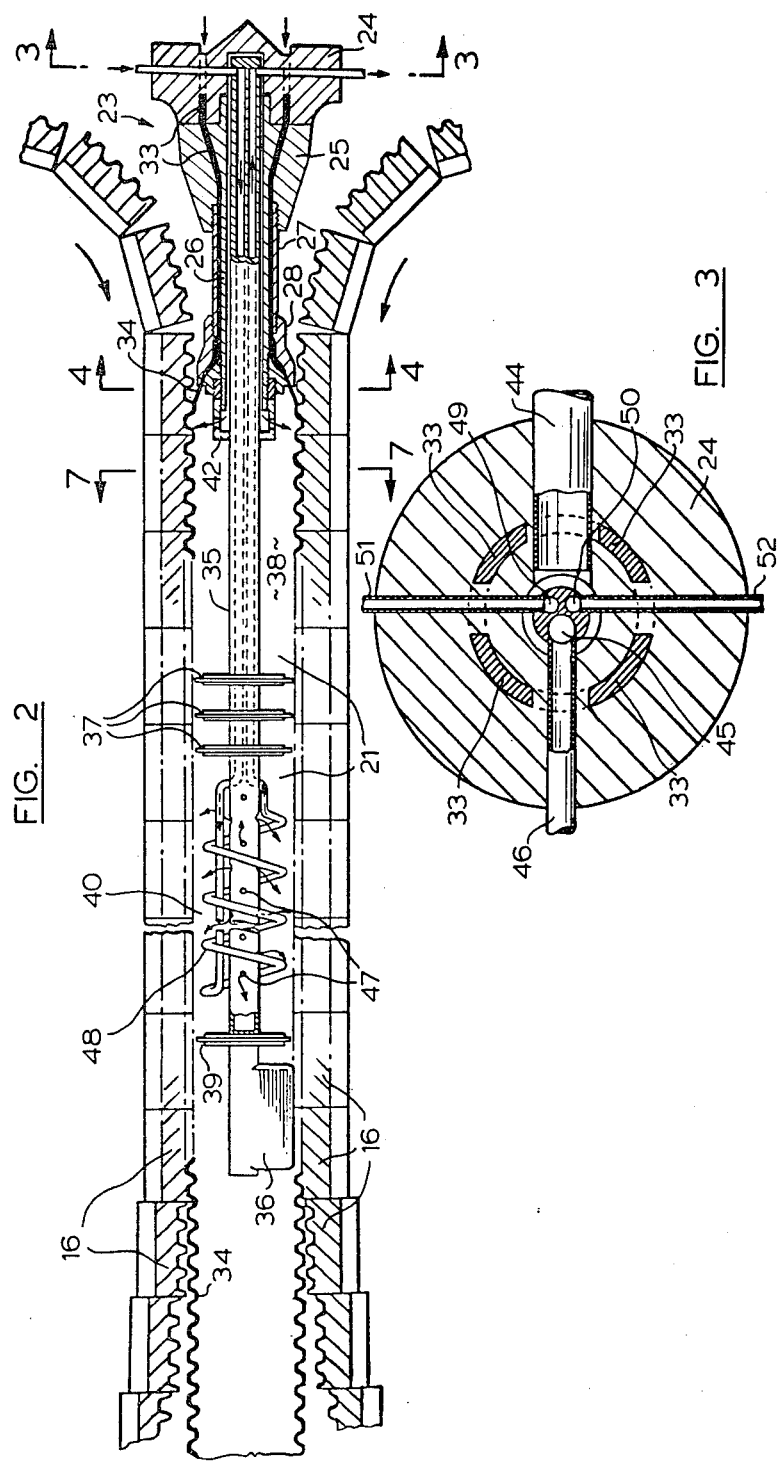

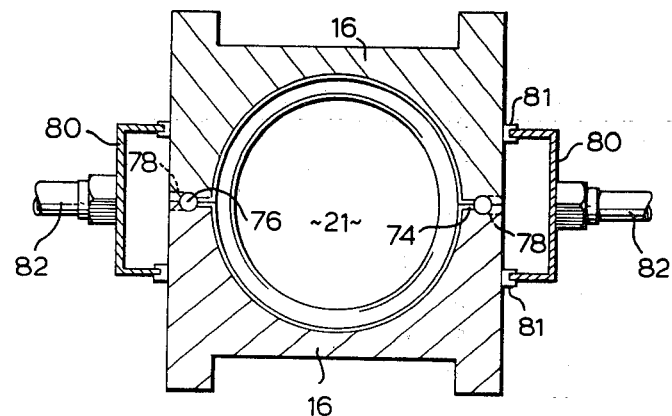
FIG. 7
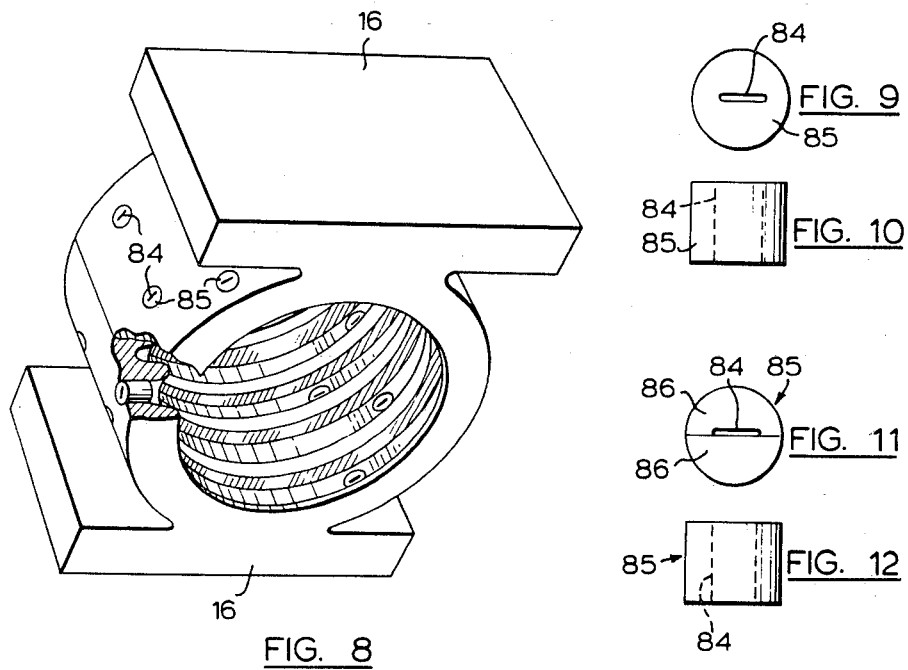
FIG. 8
FIG. 9
FIG. 10
FIG. 11
FIG. 12

APPARATUS FOR PRODUCING THERMOPLASTIC TUBING

CROSS REFERRENCE TO RELATED APPLICATION

This application is a continuation-in-part of our copending application Ser. No. 855,409, filed Nov. 28, 1977, for "Apparatus for Producing Thermoplastic Tubing" now U.S. Pat. No. 4,199,314 issued Apr. 22, 1980.

FIELD OF THE INVENTION

This invention relates to apparatus for producing corrugated thermoplastic tubing, the apparatus being of the type in which tubing of the thermoplastic material is continuously extruded into a tubular mold tunnel in which the tubing is expanded by blow molding or by vaccum forming. The tubular mold tunnel is defined by cooperatively interengaged mold blocks of a pair of mold assemblies, the mold blocks of each mold assembly being driven along a forward run in which the blocks define the tubular mold tunnel, and back along a return run. Such an apparatus is disclosed in, for example, U.S. Pat. No. 3,981,663 issued on Sept. 21, 1976 to Gerd. P. H. Lupke.

BACKGROUND OF THE INVENTION

In the production of corrugated thermoplastic tubing using apparatus of the type referred to above it is necessary to provide for the escape of gas, typically air, from the space between the tube and the wall of the mold tunnel, since the gas would otherwise form a cushion preventing the complete expansion of the tube. This is obviously so in the case where the tube is expanded by vacuum forming, and in vacuum forming apparatus it is common practice to provide vents through the mold blocks for this purpose, as described for example in U.S. Pat. No. 3,751,541, dated Apr. 7, 1973, to W. Hegler. It is also necessary to provide for the escape of entrapped gas in the case where the tube is expanded by internal gas pressure, and such provision is described for example in the U.S. Pat. No. 3,981,663, dated Sept. 21, 1976, to G. P. H. Lupke. However, in the production of corrugated tubing, as distinguished from smooth walled tubing, the exhaust of gas or removal of entrapped gas from the inside of the mold tunnel presents a special problem since the gas tends to become trapped in discrete pockets in the troughs of the corrugations of the mold blocks. To ensure accurate conformity of the tube to the wall of mold tunnel it is necessary to provide for the easy removal of all of this gas during the molding process. Furthermore, by reason of the fact that such apparatus necessarily includes a large number of accurately formed similar mold blocks, it is desirable that the mold blocks should not be structurally complicated and costly.

The present invention is primarily concerned with novel mold box structures by which these results are accomplished.

SUMMARY OF THE INVENTION

According to the invention an apparatus for producing corrugated thermoplastic tubing comprises a pair of complementary mold assemblies each comprising an endless chain of articulately interconnected mold blocks driven in synchronism with the mold blocks of the other mold assmebly along a forward run and back along a return run, the mold blocks cooperating in pairs along said forward run to provide an axially extending tubular mold tunnel having a corrugated wall defined by alternating crests and troughs in the mold-defining faces of the mold blocks, extrusion means disposed at the entrance to the mold tunnel for extruding a tube of thermoplastic material, and means for expanding the tube as it is formed to urge the tube outwardly against said corrugated wall. The mold blocks are constructed to permit the passage of gas therethrough from all regions adjacent the interior of the tunnel wall, and to this end in one form of the invention each mold block is formed with passages communicating with the base of each trough throughout the length thereof and comprising continuous grooves extending along the bases of the troughs, said passages further defining ports communicating with the exterior of the mold block; the apparatus further comprises a stationary suction chamber connected to a suction source and positioned so as to communicate with said ports during movement of the mold blocks along said forward run. Preferably the grooves extend along the bases of the troughs at the corners thereof.

For producing the tubing by blow molding the apparatus additionally includes gas supply means positioned within the mold tunnel for supplying pressurized gas to the interior of the tube as it is extruded. In this case it is preferable to provide a stationary pressure chamber connected to a source of pressurized fluid and positioned downstream of the suction chamber so as to communicate with said ports during continued movement of the mold blocks beyond the suction chamber along said forward run.

The mold blocks of each cooperating pair are preferably formed with complementary mating recesses positioned to form said passages and ports when the mold blocks are interengaged. In one embodiment of the invention each of these recesses further provides an axially extending channel positioned to mate with a complementary channel of the cooperating mold block forming therewith a manifold recess communicating with said grooves and ports.

Alternatively, in the case of apparatus intended primarily to produce the tubing by blow molding, the mold blocks may be of sintered metal which is porous to gas flow, the pores therein constituting passsages for the escape of entrapped gas from the troughs as the tube is expanded.

BRIEF DESCRIPTION OF THE DRAWINGS

Several embodiments of the invention will now be described, by way of example, with reference to the accompanying drawings, in which:

FIG. 1 is a side view of an apparatus according to one preferred embodiment;

FIG. 2 is a vertically sectioned view, on an enlarged scale, of a portion of the apparatus shown in FIG. 1;

FIG. 3 is a sectioned view, on a further enlarged scale, on the line 3—3 in FIG. 2;

FIG. 7 is a sectioned view of two cooperatively interengaged mold blocks as shown in FIG. 6;

FIG. 8 is a view of two cooperatively interengaged mold blocks according to an alternative embodiment;

FIG. 9 is a top view of one form of plug shown in FIG. 8;

FIG. 10 is a side view of the plug shown in FIG. 9;

FIG. 11 is a top view corresponding to FIG. 9 of an alternative form of plug;

FIG. 12 is a side view of this alternative form of plug shown in FIG. 11; and

DESCRIPTION OF THE PREFERRED EMBODIMENTS

Figure 4:
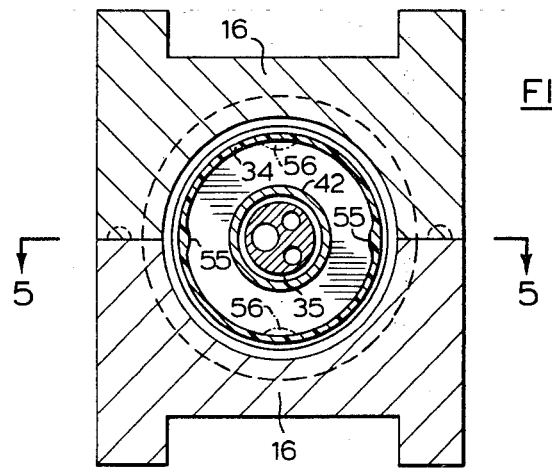
FIG. 4 is a sectioned view, on said further enlarged scale, on the line 4—4 in FIG. 2.
Figure 5:
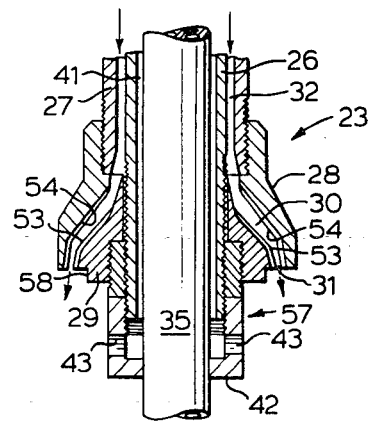
FIG. 5 is a sectioned view, again on said further enlarged scale, of a portion of an extrusion head incorporated in the apparatus, generally on the line 5—5 in FIG. 4.

Referring to the drawings and more particularly to FIG. 1 thereof, the apparatus comprises a wheeled structure including a carriage 10 having wheels 11 which run on tracks 12. A support structure 13 which is mounted on the carriage 10 supports a pair of complementary upper and lower mold assemblies 14 and 15 respectively. Each mold assembly 14 and 15 comprises an endless chain of articulately interconnected mold blocks 16. The mold assembly 14 further comprises a pair of transversely spaced endless conveyor chains (only one of which is shown in the drawings and is denoted by the reference numeral 17), with each mold block 16 of the assembly 14 extending transversely between opposed links of these chains. The mold assembly 15 likewise further comprises a pair of endless conveyor chains (only one of which is shown in the drawings and is denoted by the reference numeral 18), with each mold block 16 of the assembly 15 extending transversely between opposed links of this pair of chains including the chain 18. The chains are entrained around drive sprockets 19 and 20, with drive means (not shown) being connected to at least one of the sprockets 19 and at least one of the sprockets 20 for operatively driving the mold blocks 16 of each assembly 14 and 15 in synchronism along a forward run and back along a return run, the mold blocks 16 of the assemblies 14 and 15 cooperating in pairs along the forward run to define an axially extending tubular mold tunnel 21 (FIG. 2).

The support structure 13 includes mechanical jacks 22 interconnecting the upper and lower mold assemblies 14 and 15 and operable for raising the upper assembly 14 from the lower assembly 15, when required, to permit easy access for servicing.

By means of the wheeled carriage 10 the mold assemblies 14 and 15 are operatively positioned to locate an extrusion head 23 at the entrance to the tubular mold tunnel 21, the extrusion head 23 being operatively coupled to the nozzle of an extrusion machine, which may be of conventional form. If required, the mold assemblies 14 and 15 can be moved away from the extrusion head 23 by movement of the wheeled carriage 10 along the tracks 12 in order to provide access to the extrusion head 23.

The extrusion head 23 comprises a member 24 to which is co-axially mounted a member 25, the member 25 having an axially extending tubular portion 26 which is surrounded in spaced relationship thereto by a tubular member 27, one end portion of which is screw-threadedly connected to the member 25 and the other end portion of which is screw-threadedly supports an outer member 28. An inner core member 29 is mounted on the portion 26 of the member 25 within the member 28, the core member 29 being spaced from the member 28 to define therebetween an annular passage 30 of generally frusto-conical form which terminates in an annular orifice 31 and which communicates with the annular space 32 between the tube 27 and the portion 26 of the member 25. This annular space 32, in turn, communicates through passages 33 in the member 25 and the member 24 with the nozzle of the extrusion machine for operatively permitting tubing 34 of thermoplastic maerial to be extruded from the annular orifice 31 into the tubular mold tunnel 21.

Mounted within the extrusion head 23, and extending therefrom within the tubular mold tunnel 21, is an elongated member 35, the end of which remote from the extrusion head 23 has a rider 36 which operatively rests on the internal surface of the molded tubing 34 to support said end of the member 35. The member 35 carries a first baffle constituted by three annular seals 37 which are spaced axially from the extrusion head 23 to define therewith a first zone 38 within the tubular mold tunnel 21, and a second baffle constituted by an annular seal 39 which is spaced from the first baffle to define therewith a second zone 40 within the tubular mold tunnel 21.

Within the extrusion head 23 there is provided an annular space 41 between the member 35 and the portion 26 of the member 25. This space 41 communicates at the end thereof adjacent to the tubular mold tunnel 21 with a chamber 42 which is screw-threadedly mounted on the free end of the portion 26 of the member 25 and which has radially disposed outlet ports 43. The annular space 41 communicates through an air inlet pipe 44 mounted in the member 24 with a source of pressurized gas, such as air, for supplying pressurized air to the zone 38 of the tubular mold tunnel 21. This flow of pressurized air to the zone 38 urges the tubing 34 of thermoplastic material as it is extruded from the annular orifice 31 of the extrusion head 23, outwardly against the cooperatively interengaged mold blocks 16 defining the tunnel 21 thereby to blow mold the tubing 34. The interengaged pairs of mold blocks 16 defining the tunnel 21 move along the forward runs thereof to convey the tubing 34 as it is formed away from the extrusion head 23.

The member 35 has an axially extending duct 45 which communicates through an air inlet pipe 46 mounted in the member 24 with a source of cooling air, the duct 45 also communicating through openings 47 in the member 35 with the zone 40 of the tubular mold tunnel 21 so that cooling air may be discharged into the zone 40 for cooling and setting the thermoplastic material of the tubing 34. To assist cooling of this cooling air a cooling coil 48 is mounted on the member 35 within the zone 40 and communicates with a pair of ducts 49 and 50 provided within the member 35, inlet and outlet connections 51 and 52 for cooling fluid being connected to these ducts 49 and 50, respectively.

The annular orifice 31 of the extrusion head 23 has portions of increased width in axial alignment with the locations of interengagement between the mold blocks 16 of the assemblies 14 and 15 in the forward runs thereof, these portions of increased width being provided by grooves 53 which are formed in the face of the core member 29 which bounds the annular passage 30; alternatively these portions of increased width may be provided by grooves 54 formed in the face of the outer member 28 which bounds the annular passage 30, or may be provided by grooves 53 and 54 in the faces of the core member 29 and the outer member 28 which bound the annular passage 30. The portions of the annular orifice 31 of increased width result in the thermoplastic tubing 34 having axially extending portioons 55 of increased thickness, which thus serve to strengthen the tubing 34 at the locations of the interengagement between the mold blocks 16 of the assemblies 14 and 15, these locations otherwise tending to be locations of weakness in the tubing 34.

As shown in FIG. 4 the tubing 34 may be provided with one or more additional axially extending portions 56 of increased thickness by providing the annular orifice 31 of the extrusion head 23 with correspondingly located additional portions of increased width.

An adjustment nut 57 is screw-threadedly mounted on the portion 26 of the member 25 with the core member 29 being screw-threadedly mounted on this nut 57. The core member 29 is provided with flats 58 or the like by means of which the core member 29 may be restrained against rotation while the nut 57 is rotated to move the core member 29 towards or away from the outer member 28, thereby to vary the width of the annular orifice 31 while retaining the portions of the annular orifice 31 of increased width in axial alignment with the locations of interengagement between the mold blocks 16 of the assemblies 14 and 15.

As shown in FIG. 1, each mold assembly 14, 15 may further comprise an air distributing duct 59, 60 extending along the return run of the mold blocks 16 of the respective mold assembly 14 and 15 and positioned to distribute cooling air to the exposed interior surfaces of the mold blocks 16 as they travel along the return run. The distributing ducts 59, 60 are each connected to a respective blower 60, 61 by which the cooling air is supplied to them. Each mold assembly 14, 15 further comprises a heat sink provided by a tank through which cooling water may be circulated, inlet and outlet water connections 62, 63 and 62a, 63a, being shown. The mold assembly housings may be cooled in this manner during a molding operation; however, in order to avoid wastage of material at the commencement of a molding operation, the water in the housings may be preheated to the required temperature by electrical immersion heaters mounted in the walls of the housings as shown at 64, 65.

Figure 6:
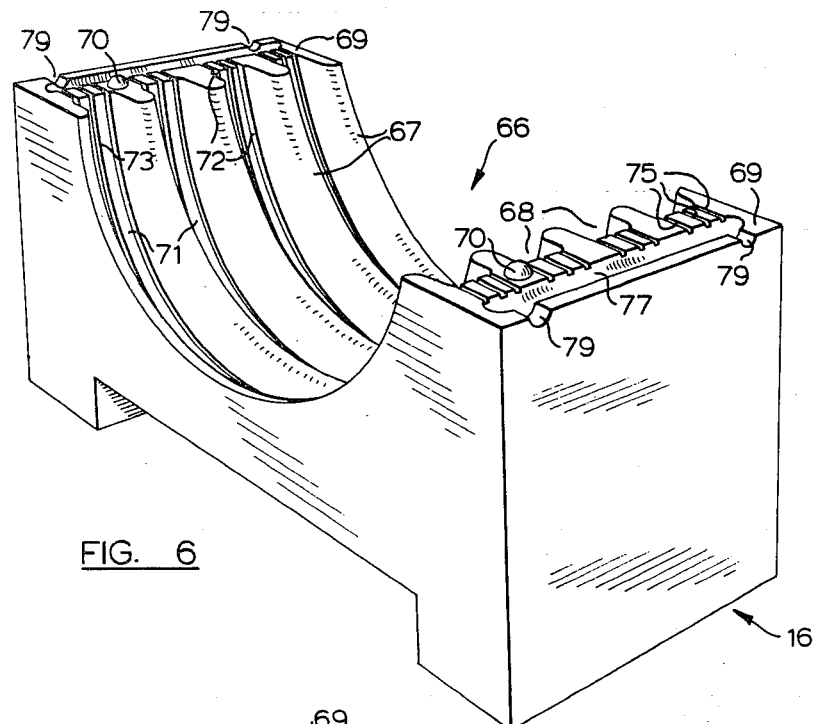
FIG. 6 is a perspective view, on a still further enlarged scale, of a representative one of the mold blocks incorporated in the apparatus shown in the preceding views.

Referring now to FIGS. 6 and 7, it will be noted that each mold block 16 is of generally rectangular shape having a pair of end faces, side and bottom faces, and a top face which is provided with a hemi-cylindrical recess 66 contoured to provide a corrugated mold wall defined by alternating crests 67 and troughs 68. As shown in FIG. 6 the top face 69 of the block 16 is provided with a pair of locating pins 70 one of which is disposed on each side of the hemi-cylindrical recess 66, these pins 70 being adapted to register with correspondingly shaped sockets in the complementary top face 69 of a cooperating mold block 16 of the other mold assembly 14 or 15.

During the blow molding of the thermoplastic tubing 34 there is, as hereinbefore described, a tendency for atmospheric air to be trapped by the tubing 34 in the troughs 68, this entrapped air preventing proper molding of the tubing 34 in the troughs 68, and particularly in the corners at the bases 71 of the troughs 68. As is most clearly shown in FIG. 6 a continuous groove 72 is provided in each corner of the base 71 of each trough 68. An additional groove 73 may also be provided in the base 71 of each trough 68 between the corner grooves 72. These grooves 72 and 73 communicate with the exterior of the mold block 16 through passages 74 constituted by mating recesses 75 in the top faces 69 of the cooperatively interengaging mold blocks 16, axially extending manifold recesses 76 constituted by axially extending mating channels 77 in the top faces 69 of the cooperating mold blocks 16, and ports 78 constituted by mating recesses 79 in the top faces 69 of the cooperating mold blocks 16.

A stationary suction chamber 80 is mounted on each side of the forward runs of the mold blocks 16 of the assemblies 14 and 15, each chamber 80, which has a resilient sealing edge portion 81 bearing against the side faces of the mold blocks 16, communicating with the ports 78 and being connected through a pipe 82 to a suction source 80' shown diagrammatically in FIG. 1, thereby to extract atmospheric air trapped in the troughs 68 and particularly air trapped at the corners of the bases 71 of the troughs 68 in order to ensure proper forming of the thermoplastic tubing 34 therein.

A stationary pressure chamber 83 which corresponds in structure to each of the stationary suction chambers 80 may be mounted on each side of the forward runs of the mold blocks 16 of the assemblies 14 and 15, each pressure chamber 83 as shown in FIG. 1 being disposed downstream of the adjacent suction chamber 80 and communicating with the ports 78 during continued movement of the mold blocks 16 beyond the suction chamber 80. Each pressure chamber 83 is connected to a source 83' of pressurized fluid such as pressurized air which serves after the cooling and setting of the thermoplastic tubing 34 has been completed positively to urge the tubing 34 out of the mold blocks 16, the source 83' being shown diagrammatically in FIG. 1.

FIG. 8 shows an alternative embodiment in which throughout the length of the base 71 of each trough 68 each mold block 16 is provided with a series of vents formed by slits 84 disposed in the corners of the base 71 of the trough 68, these slits 84 communicating with the exterior of the mold block 16 in order again to permit escape of atmospheric air which is trapped in the troughs 68, and particularly at the corners of the bases 71 of the troughs. The slits 84 may be formed through each mold block 16 by a spark erosion technique, or alternatively as is shown in FIG. 8 each slit 84 may be formed through a plug 85 which is mounted in a hole in the mold block 16. Such a plug 85 with the slit 84 formed therethrough is shown in FIGS. 9 amd 10. FIGS. 11 and 12 show an alternative form of this embodiment of the invention in which each plug 85 is in two parts 86 with a recess which constitutes the slit 84 being provided by milling in one of the mating faces. It will of course be appreciated that mating recesses could alternatively be formed in both mating faces of the two parts 86 of the plug 85.

Thus, the grooves 72 and 73, the manifold recesses 76 and the ports 78 (FIGS. 6 and 7) or the slits 84 (FIGS. 8, 9, 10, 11 and 12) constitute passages which extend betwen the bases 71 of the troughs 68 of the corrugations, and particularly the corners thereof, and the exterior of the associated mold block 16. These passages communicate with the base 71 of each trough 68 throughout its length. The grooves 72, 73 and slits 84 are generally rectangular and sufficiently narrow in width to prevent any of the thermoplastic material of the tubing 34 from being forced into these grooves 72, 73 or slits 84, The grooves 72, 73 and slits 84 may each have a width of approximately 0.02 inches, and the length of each slit 84 may be approximately 0.50 inches.

According to an alternative embodiment of the invention, each mold block 16 is of sintered metal which is porous to gas flow, the pores constituting passages corresponding to the above-mentioned passages.

Figure 13:
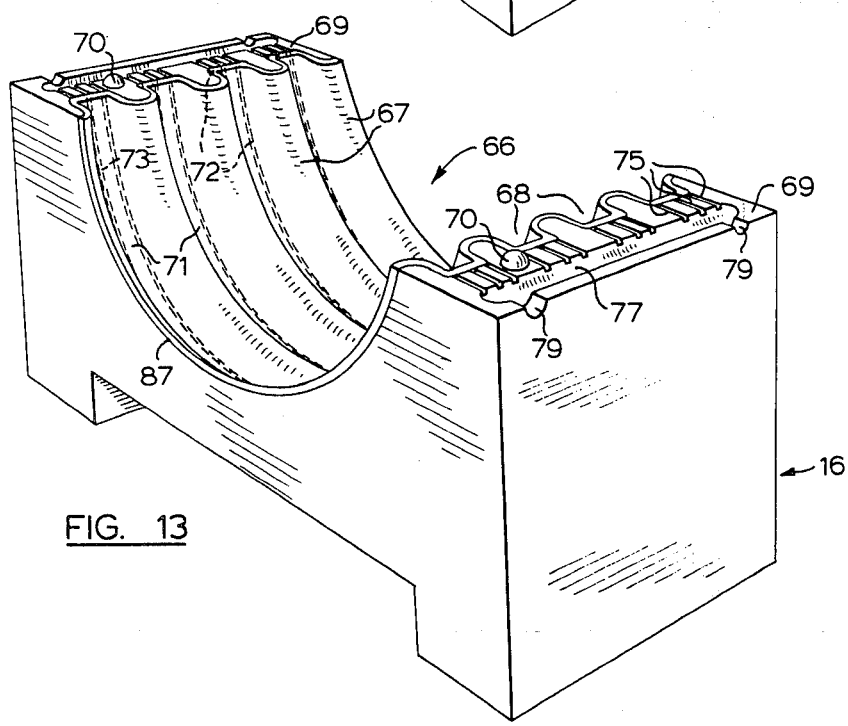
FIG. 13 is a view corresponding to FIG. 6 of a mold block according to a further alternative embodiment.

In FIG. 13 there is shown a mold block 16 according to a further alternative embodiment of the invention. The mold block 16 is identical to that shown in FIG. 6 and corresponding reference numerals are used to denote corresponding parts, except that the hemicylindrical recess 66 is provided with a liner 87 of sintered metal which is porous to gas flow. The liner 87 overlies the grooves 72, 73 which in this case are preferably considerably wider than the grooves 72, 73 shown in FIGS. 6 and 7 since, the presence of the liner 87 prevents the thermoplastic material of the tubing 34 being forced into these channels. Thus according to this embodiment of the invention, each mold block includes a liner of sintered metal which is formed with corrugations conforming to the troughs and crests in the mold-defining face of the mold block. The liner 87 covers the grooves 72, 73 and is permeable to gas to permit gas to flow therethrough into the grooves.

The liners of each cooperating pair of mold blocks are complementary and form, together with the liners of the other cooperating pairs of mold blocks, a continuous porous lining to the mold tunnel.

What we claim is:

1. In an apparatus for producing corrugated thermoplastic tubing, the apparatus comprising a pair of complementary mold assemblies each comprising an endless chain of articulately interconnected mold blocks driven in synchronism with the mold blocks of the other mold assembly along a forward run and back along a return run, the mold blocks cooperating in pairs along said forward run to provide an axially extending tubular mold tunnel having a corrugated wall defined by alternating crests and troughs in the mold-defining faces of the mold blocks, extrusion means disposed at the entrance to the mold tunnel for extruding a tube of thermoplastic material, and means for expanding the tube as it is formed to urge the tube outwardly against said corrugated wall, the improvement in which each mold block is formed with passages communicating with the base of each trough throughout the length thereof and comprising continuous grooves extending along the bases of the troughs, said passages further defining ports communicating with the exterior of the mold block, wherein said grooves extend along the bases of the troughs at the corners thereof.

2. Apparatus according to claim 1, the apparatus further comprising a stationary suction chamber connected to a suction source and positioned so as to communicate with said ports during movement of the mold blocks along said forward run.

3. Apparatus according to claim 2, including gas supply means positioned within the mold tunnel for supplying pressurized gas to the interior of the tube as it is extruded.

4. Apparatus according to claim 2, wherein the mold blocks of each cooperating pair are formed with complementary mating recesses positioned to form said passages and said ports when the mold blocks are interengaged.

5. Apparatus according to claim 4, wherein each of said recesses further provides an axially extending channel positioned to mate with a complementary channel of the cooperating mold block forming therewith a mainfold recess communicating with said grooves and said ports.

* * * * *